United States Patent
Venugopal et al.

(10) Patent No.: US 11,930,466 B2
(45) Date of Patent: Mar. 12, 2024

(54) FREQUENCY PRE-COMPENSATION FOR WIRELESS NETWORKS

(71) Applicant: QUALCOMM Incorporated, San Diego, CA (US)

(72) Inventors: Kiran Venugopal, Raritan, NJ (US); Wooseok Nam, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 247 days.

(21) Appl. No.: 17/454,996

(22) Filed: Nov. 15, 2021

(65) Prior Publication Data

US 2023/0156643 A1    May 18, 2023

(51) Int. Cl.
*H04B 7/12* (2006.01)
*H04B 7/022* (2017.01)
(Continued)

(52) U.S. Cl.
CPC ........ *H04W 56/0035* (2013.01); *H04B 7/022* (2013.01); *H04B 7/12* (2013.01); *H04B 17/104* (2015.01); *H04B 17/24* (2015.01); *H04B 17/252* (2023.05); *H04B 17/364* (2015.01); *H04W 24/08* (2013.01); *H04W 24/10* (2013.01); *H04W 48/04* (2013.01); *H04W 48/16* (2013.01); *H04W 56/0015* (2013.01); *H04W 56/005* (2013.01); *H04W 56/0055* (2013.01);
(Continued)

(58) Field of Classification Search
CPC ..... H04B 7/02–12; H04B 17/0082–409; H04J 11/0023–0093; H04J 2011/0003–0096; H04L 5/0001–26; H04W 8/18–245; H04W 24/02–10; H04W 28/02–26; H04W 36/0005–385; H04W 48/02–20; H04W 56/0005–0095; H04W 60/005–06; H04W 64/003–006; H04W 72/02–569; H04W 74/002–0891; H04W 84/02–16; H04W 88/02–12; H04W 92/02–04; H04W 92/10–12

See application file for complete search history.

(56) References Cited

U.S. PATENT DOCUMENTS

2023/0064231 A1* 3/2023 Haghighat ............ H04W 72/51
2023/0131134 A1* 4/2023 Mei ........................ H04W 72/51

FOREIGN PATENT DOCUMENTS

WO    WO-2023038557 A1 *  3/2023  ............ H04W 72/04

OTHER PUBLICATIONS

3GPP TSG RAN WG1 Meeting #104b-e, e-Meeting, Apr. 12-20, 2021.
3GPP TSG RAN WG1 Meeting #106-e, R1-210xxxx, e-Meeting, Aug. 16-27, 2021.

* cited by examiner

*Primary Examiner* — Timothy J Weidner
(74) *Attorney, Agent, or Firm* — Patterson + Sheridan, LLP

(57) ABSTRACT

Certain aspects of the present disclosure provide techniques for wireless communications by a user equipment (UE) including receiving a first reference signal (RS) from a first transmission reception point (TRP); receiving a second RS from a second TRP, wherein the first TRP and the second TRP are both associated with a BS; and transmitting, to the BS, an indication that one of a first shifted carrier frequency at which the first RS is received or a second shifted carrier
(Continued)

frequency at which the second RS is received is preferred for use by the UE as a reference carrier frequency for demodulation.

26 Claims, 11 Drawing Sheets

(51) Int. Cl.
    *H04B 17/10*     (2015.01)
    *H04B 17/20*     (2015.01)
    *H04B 17/24*     (2015.01)
    *H04B 17/364*     (2015.01)
    *H04W 24/08*     (2009.01)
    *H04W 24/10*     (2009.01)
    *H04W 48/04*     (2009.01)
    *H04W 48/16*     (2009.01)
    *H04W 56/00*     (2009.01)
    *H04W 72/02*     (2009.01)
    *H04W 72/0453*     (2023.01)
    *H04W 72/21*     (2023.01)
    *H04W 72/23*     (2023.01)
    *H04W 84/02*     (2009.01)
    *H04W 88/02*     (2009.01)
    *H04W 88/08*     (2009.01)
    *H04W 92/02*     (2009.01)
    *H04W 92/10*     (2009.01)

(52) U.S. Cl.
    CPC ....... *H04W 72/02* (2013.01); *H04W 72/0453* (2013.01); *H04W 72/21* (2023.01); *H04W 72/23* (2023.01); *H04W 84/02* (2013.01); *H04W 88/02* (2013.01); *H04W 88/08* (2013.01); *H04W 92/02* (2013.01); *H04W 92/10* (2013.01)

FREQUENCY PRE-COMPENSATION FOR WIRELESS NETWORKS

INTRODUCTION

Aspects of the present disclosure relate to wireless communications, and more particularly, to techniques for frequency pre-compensation for wireless communication.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

In one aspect, a method for wireless communications by a user equipment (UE) includes receiving a first reference signal (RS) from a first transmission reception point (TRP); receiving a second RS from a second TRP, wherein the first TRP and the second TRP are both associated with a BS; and transmitting, to the BS, an indication that one of a first shifted carrier frequency at which the first RS is received or a second shifted carrier frequency at which the second RS is received is preferred for use by the UE as a reference carrier frequency for demodulation.

In one aspect, a UE is described. The UE includes a memory and a processor coupled to the memory. The memory and the processor are configured to cause the UE to: receive a first RS from a first TRP; receive a second RS from a second TRP, wherein the first TRP and the second TRP are both associated with a BS; and transmit, to the BS, an indication that one of a first shifted carrier frequency at which the first RS is received or a second shifted carrier frequency at which the second RS is received is preferred for use by the UE as a reference carrier frequency for demodulation.

In one aspect, a non-transitory computer readable medium storing code for wireless communication is described. In some examples, the code comprises instructions executable by a processor to cause a UE to: receive a first RS from a first TRP; receive a second RS from a second TRP, wherein the first TRP and the second TRP are both associated with a BS; and transmit, to the BS, an indication that one of a first shifted carrier frequency at which the first RS is received or a second shifted carrier frequency at which the second RS is received is preferred for use by the UE as a reference carrier frequency for demodulation.

In one aspect, a UE for wireless communications is described. The UE includes: means for receiving a first RS from a first TRP; means for receiving a second RS from a second TRP, wherein the first TRP and the second TRP are both associated with a BS; and means for transmitting, to the BS, an indication that one of a first shifted carrier frequency at which the first RS is received or a second shifted carrier frequency at which the second RS is received is preferred for use by the UE as a reference carrier frequency for demodulation.

In one aspect, a method for wireless communications by a base station (BS) includes transmitting, via a first TRP, a first RS to a UE; transmitting, via a second TRP, a second RS to the UE, wherein the first TRP and the second TRP are both associated with the BS; and receiving, via one or more of the first TRP or the second TRP, an indication from the UE that one of a first shifted carrier frequency at which the first RS is received or a second shifted carrier frequency at which the second RS is received is preferred for use by the UE as a reference carrier frequency for demodulation.

In one aspect, a BS is described. The BS includes a memory and a processor coupled to the memory. The memory and the processor are configured to cause the BS to: transmit, via a first TRP, a first RS to a UE; transmit, via a second TRP, a second RS to the UE, wherein the first TRP and the second TRP are both associated with the BS; and receive, via one or more of the first TRP or the second TRP, an indication from the UE that one of a first shifted carrier frequency at which the first RS is received or a second shifted carrier frequency at which the second RS is received is preferred for use by the UE as a reference carrier frequency for demodulation.

In one aspect, a non-transitory computer readable medium storing code for wireless communication is described. In some examples, the code comprises instructions executable by a processor to cause a BS to: transmit, via a first TRP, a first RS to a UE; transmit, via a second TRP, a second RS to the UE, wherein the first TRP and the second TRP are both associated with the BS; and receive, via one or more of the first TRP or the second TRP, an indication from the UE that one of a first shifted carrier frequency at which the first RS is received or a second shifted carrier frequency at which the second RS is received is preferred for use by the UE as a reference carrier frequency for demodulation.

In one aspect, a BS for wireless communications is described. The BS includes: means for transmitting, via a first TRP, a first RS to a UE; means for transmitting, via a second TRP, a second RS to the UE, wherein the first TRP and the second TRP are both associated with the BS; and means for receiving, via one or more of the first TRP or the second TRP, an indication from the UE that one of a first shifted carrier frequency at which the first RS is received or a second shifted carrier frequency at which the second RS is received is preferred for use by the UE as a reference carrier frequency for demodulation.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

DETAILED DESCRIPTION

Figure 1:
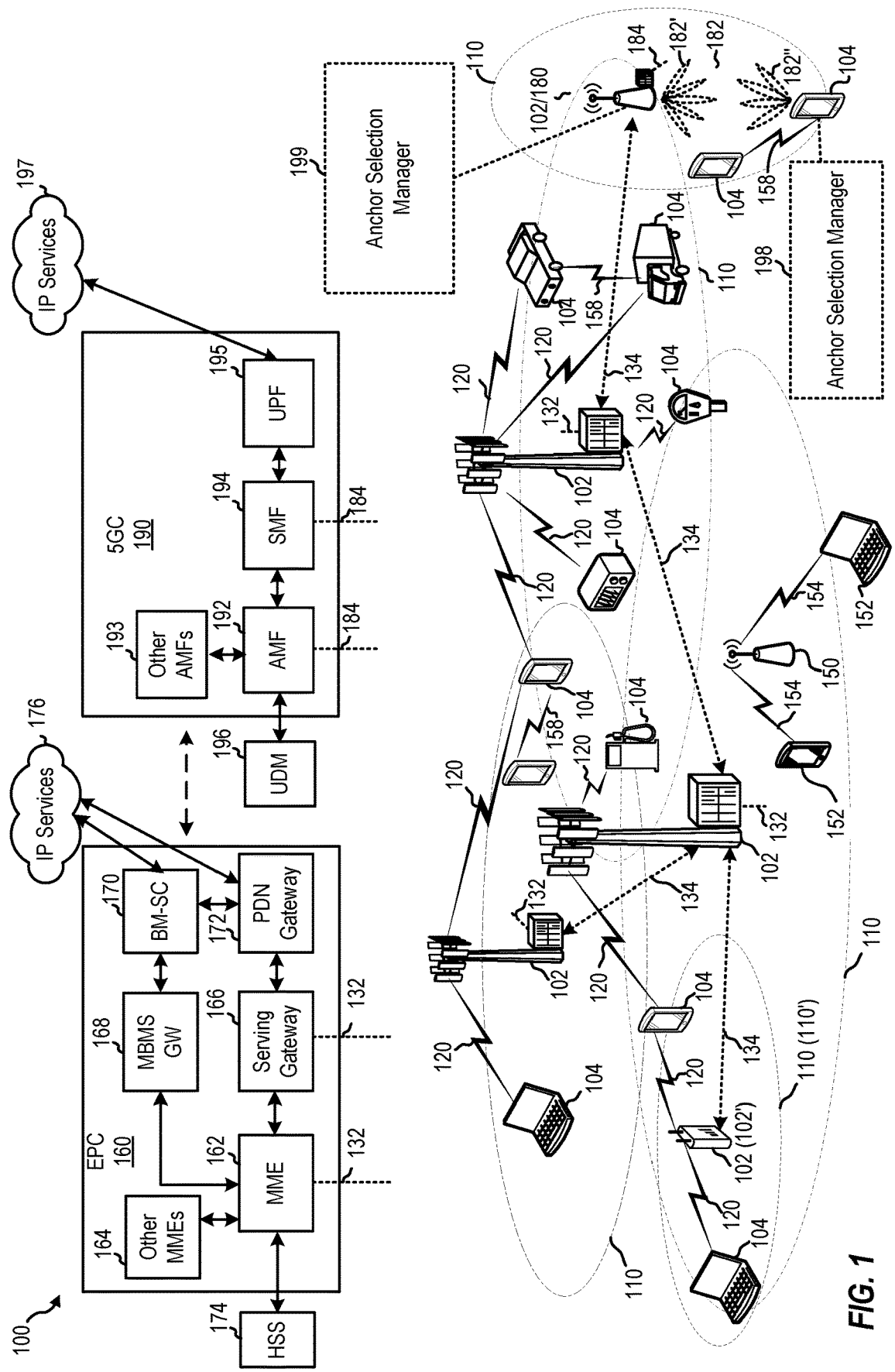
FIG. 1 is a block diagram conceptually illustrating an example wireless communication network.

Aspects of the present disclosure provide apparatuses, methods, processing systems, and computer-readable mediums for frequency pre-compensation for wireless communication.

Wireless communications systems are widely deployed to provide various types of communication content such as voice, video, packet data, messaging, broadcast, and so on. These systems may be capable of supporting communication with multiple users by sharing available system resources. A wireless multiple-access communications system may include a number of base stations (BSs), each simultaneously supporting communications for multiple communication devices, which may be otherwise known as user equipment (UE). BSs may have numerous transmission and reception points (TRPs, also known as remote radio heads (RRHs)) connected to them (e.g., via fiber), spaced at various points distant from the BS to expand the coverage area outside the range of the BS itself.

Some TRPs may be located along the path of a high-speed train (HST) to enable communication between the BS and UEs located on the train during transit. Though certain aspects herein are discussed with respect to an HST scenario, it should be noted that the techniques herein may apply to other suitable communication scenarios. The TRPs may operate using a single (common) frequency when communicating with a UE, making the existence of multiple TRPs transparent to a UE. In particular, where the UE receives signals from the multiple TRPs all at the same single carrier frequency, the signals are received as combined (e.g., in the analog domain) by the UE, as though transmitted from a single transmitter from the perspective of the UE.

However, problems arise when multiple TRPs transmit on the downlink to a (e.g., rapidly) moving UE. As the UE moves toward a TRP, the UE may receive a signal transmitted by the TRP at a higher carrier frequency than the carrier frequency at which the TRP transmits the signal because of the Doppler effect. In particular, the Doppler effect causes a Doppler shift in the carrier frequency as received at the UE. Accordingly, the different carrier frequency at which the UE receives the signal may be referred to as a shifted carrier frequency. Similarly, as the UE moves away from a TRP, the UE receive a signal transmitted by the TRP at a lower carrier frequency than the carrier frequency at which the TRP transmits the signal because of the Doppler effect. In certain aspects, signals from different TRPs may have different Doppler shifts in the carrier frequency as received at the UE, such as because the UE may be moving toward one TRP while moving away from another TRP.

If the Doppler shift becomes too great, the UE may be unable to properly demodulate the signal transmitted from the TRP as it may be configured to expect the signal at a different carrier frequency. For example, the UE may be using a particular reference carrier frequency to demodulate signals based on a configuration of the UE, which if different than the carrier frequency of the received signal, results in the UE filtering out the received signal. In certain aspects, this is because the Doppler shift may be greater than the pull-in range (e.g., a maximum frequency difference between the local oscillator or clock and the reference frequency of a phase-locked loop over which the local oscillator can be locked) at the UE.

One method for resolving issues associated with the Doppler effect is by pre-compensating (e.g., increasing or decreasing) a carrier frequency over which signals are transmitted by one or more of the TRPs to a UE based on an estimation of the Doppler effect. For example, where multiple TRPs are transmitting to the UE, one of more of the TRPs may apply a corresponding compensation such that different TRPs may use a different carrier frequency for transmitting signals, such that when the signals are received at the UE, they are all received by the UE near a reference carrier frequency of the UE. Thus, the UE can properly demodulate the signals.

In certain aspects, one of the TRPs of the multiple TRPs transmitting to a UE is selected as an "anchor" TRP. For example, each TRP may transmit a reference signal (RS) such as a tracking RS (TRS) to the UE. The UE may measure a signal/channel quality (e.g., reference signal received power (RSRP), reference signal received quality (RSRQ), signal to interference plus noise ratio (SINR), etc.) of each received TRS. Further, each TRS may be received at a particular carrier frequency (e.g., shifted carrier frequency). One of the shifted carrier frequencies at which one of the TRSs is received may be used by the UE as its reference carrier frequency for demodulation. The anchor TRP may be the TRP that transmitted the TRS received at the shifted carrier frequency used by the UE as its reference carrier frequency. Accordingly, in certain aspects, the other TRP(s) perform pre-compensation such that signals from the other TRP(s) are also received near the reference carrier frequency of the UE, meaning they pre-compensate their carrier frequencies based on the "anchor" TRP. In some aspects, a BS of the TRPs may perform Doppler estimation based on RS (e.g., sounding reference signal (SRS)) transmitted by the UE as received at each of the TRPs. For example, in some aspects, the UE transmits one RS that is received at each of the TRPs. In some aspects, a UE may perform Doppler estimation based on RS (e.g., TRS) transmitted by the TRPs of the BS.

In certain aspects, the anchor TRP is used as a common connection point to be maintained as a UE moves through radio coverage areas that have different connection points. This allows the UE to measure signals from non-anchor TRPs relative to signals from the anchor TRP. An anchor TRP may also provide a communication link for one or more of control plane data or user plane data, whereas the non-anchor TRPs may only be used for user plane data.

Doppler estimations made by either of a UE or a BS may not accurately represent an actual Doppler spread. In some examples, this results in a pre-compensated downlink signal from one TRP (e.g., non-anchor TRP) not being aligned with the frequency offset of another downlink signal from another TRP (e.g., anchor TRP). The gain at the UE from TRP-based pre-compensation therefore depends on the accuracy of the Doppler estimation. In certain aspects, which TRP is selected as the anchor TRP for the UE affects the gain at the UE from TRP-based pre-compensation, such as because a higher signal quality link among the UEs links with the different TRPs used as an anchor TRP may ensure that such a signal is more likely received at the UE's reference carrier frequency. Therefore, the UE is likely to receive a higher signal quality signal from the anchor TRP at the UE's reference carrier frequency and demodulate such a signal and be able to decode, thereby leading to more reliable communications.

Thus, aspects of the disclosure are directed to UE-assisted pre-compensation anchor TRP preference. In particular, certain aspects provide for the UE to convey to the BS a preferred anchor TRP or preferred TRS. The UE may then use as its reference carrier frequency for demodulation, the shifted carrier frequency at which the preferred TRS, from the anchor TRP, is received. Further, the non-anchor TRPs may perform pre-compensation based on the carrier frequency of the anchor TRP, such that the signals from the non-anchor TRPs are more likely received at the UE at its reference carrier frequency.

In certain aspects, the UE notifies the BS as to a preferred anchor TRP in a feedback report (e.g., channel state information (CSI) report, other report, etc.) provided to the BS. In certain aspects, the UE is configured to notify the BS as to a preferred anchor TRP on a scheduled basis, such as periodically. For example, in certain aspects, the BS configures the UE to notify the BS of a current preferred anchor TRP according to a schedule, such as via the BS transmitting a configuration message to the UE. In certain aspects, the UE is configured to notify the BS as to a preferred anchor TRP based on a trigger received from the BS. For example, in certain aspects, the BS transmits a message (e.g., a downlink control information (DCI)), that when received by the UE, causes the UE to notify the BS as to a preferred anchor TRP. In another example, the UE is configured to notify the BS as to a preferred anchor TRP based on a trigger occurring at the UE, such as based on a L1-event detected by the UE, based on signal quality changing by a threshold, etc. In certain aspects, for such UE event triggered notification, the BS configures the UE to notify the BS of a current preferred anchor TRP according to one or more events occurring at the UE such as via the BS transmitting a configuration message to the UE. In certain such aspects, the UE may request an uplink grant from the BS to transmit the indication of the preferred anchor TRP.

It should be noted that where it is described that reference to a preferred anchor TRP may similarly refer to a preferred TRS or preferred reference carrier frequency. For example, the UE may notify the BS of a preferred TRS or preferred reference carrier frequency. For example, the UE may perform Doppler estimation, including one or more of estimating Doppler shift, Doppler spread, or average delay of one or more RS s associated with one or more TRPs of the BS. The UE may include the Doppler estimation as Doppler feedback in the feedback report along with an indication of the preferred anchor TRP. In certain aspects, the indication comprises a (e.g., single) bit. In certain aspects, the indication is implicit and comprises signal quality feedback of the TRSs, wherein the TRP associated with the TRS with the highest signal quality is assumed as the anchor TRP.

In certain aspects, the indication (e.g., bit, signal quality feedback, etc.) is transmitted by the UE to the BS in signaling, such as not in a feedback report. For example, the UE may provide the indication regardless of which of the UE or the BS is configured to perform Doppler estimation.

In certain aspects, such as where the BS is configured to perform Doppler estimation based on RS (e.g., SRS) transmitted by the UE, the UE indicates a preferred anchor TRP via separate signaling from the RS, such as in uplink control information, media access control (MAC) control element (CE), etc. In certain aspects, the UE indicates a preferred anchor TRP implicitly via a resource in which it transmits the RS to the BS. For example, different time-frequency resources may be mapped to different TRPs.

In certain aspects, the BS may notify the UE of which TRP will function as the anchor TRP meaning it indicates to the UE which shifted carrier frequency to use as its reference carrier frequency. In certain aspects, the BS may select the preferred anchor TRP of the UE, or a different TRP to be the anchor TRP. In certain aspects, the BS may send an indication of the anchor TRP via (e.g., along with) a scheduling downlink control information (DCI) or using a MAC-CE that activates (e.g., two) transmission configuration indicator (TCI) states for the SFN transmission. For example, in certain aspects, the indication comprises one or more bits that explicitly indicate which TCI state indicates Doppler parameters indicating the anchor TRP. In certain aspects, the indication comprises an implicit indication via the order in which TCIs are listed in, for example, a MAC-CE activation message. For example, the first TCI in order may indicate the Doppler parameters indicating the anchor TRP.

In certain aspects, one or more of the UE or BS may measure link quality of multiple TRPs of the SFN to determine which TRP is best suited to serve as an anchor TRP for Doppler estimation. In some examples, a pre-compensation may be determined based on both on the measured link quality as well as the Doppler estimation, leading to more effective frequency pre-compensation.

Certain aspects are directed to a UE configured to perform Doppler estimation and channel state estimation based on downlink signals received from one or more TRPs.

Introduction to Wireless Communication Networks

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes an anchor selection manager 199, which may be configured to determine an anchor TRP for communication with the UE. Wireless network 100 further includes an anchor selection manager 198, which may be used configured to determine a preferred anchor TRP, such as based on channel quality estimation.

Figure 2:
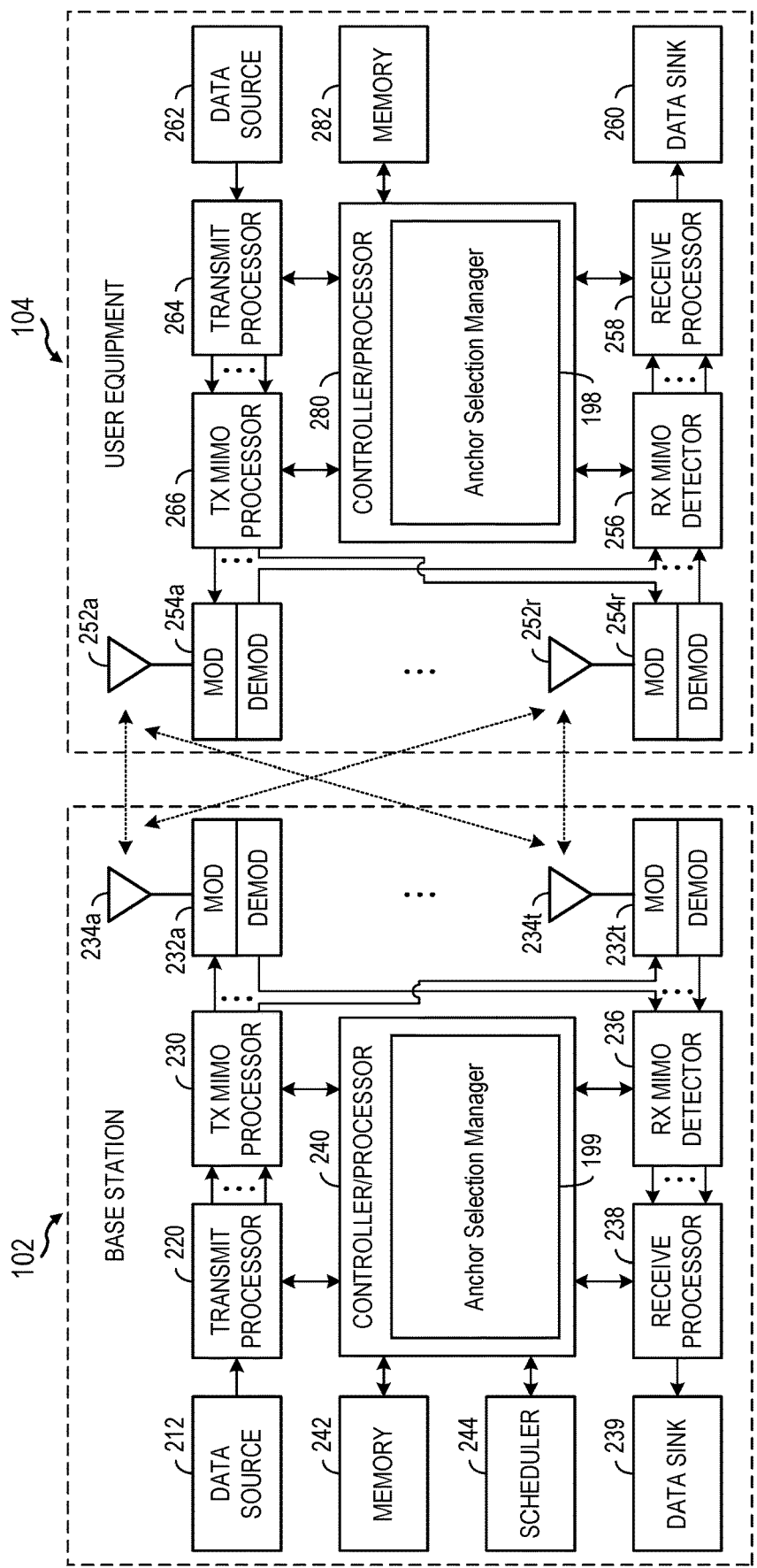
FIG. 2 is a block diagram conceptually illustrating aspects of an example of a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes the anchor selection manager 199. Notably, while depicted as an aspect of controller/processor 240, anchor selection manager 199 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes anchor selection manager 198. Notably, while depicted as an aspect of controller/processor 280, anchor selection manager 198 may be implemented additionally or alternatively in various other aspects of user equipment 104 in other implementations.

Figure 3:
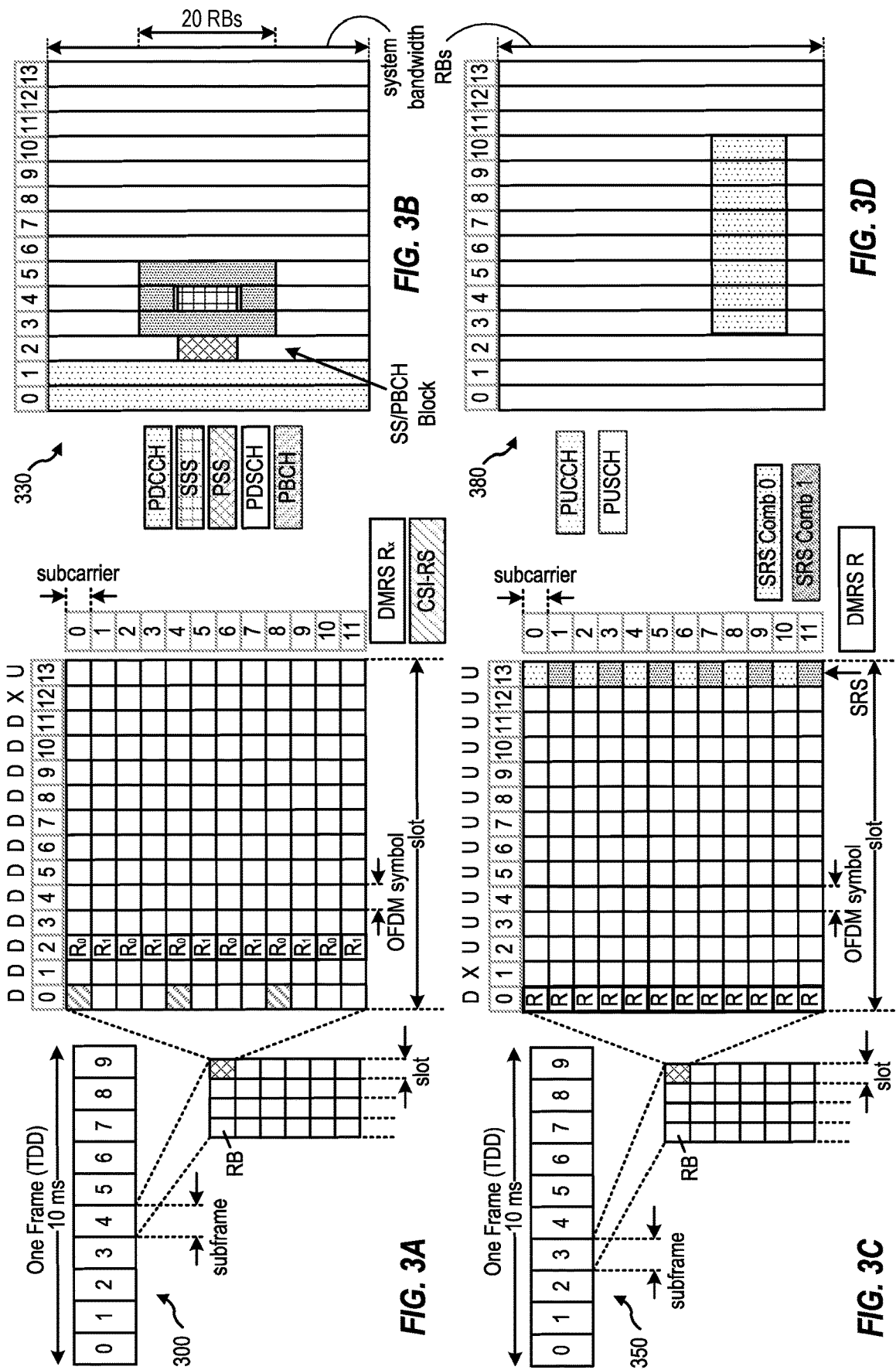
FIGS. 3A-3D depict various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Aspects Related to High Speed Train (HST) Single Frequency Networks (SFN)

Figure 4:
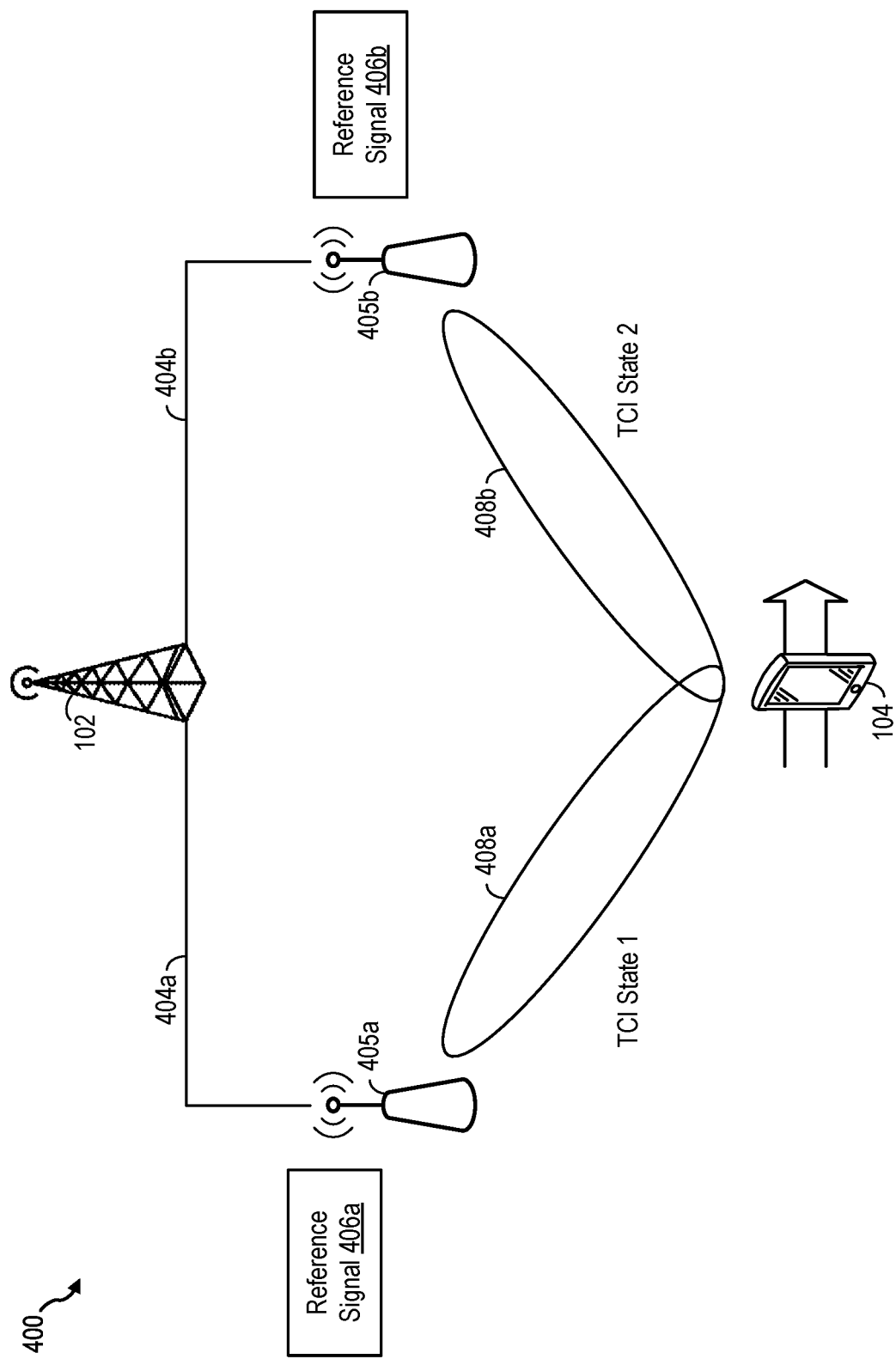
FIG. 4 is a diagram illustrating a single frequency network (SFN) scenario.

FIG. 4 is a block diagram illustrating a high speed train (HST) single frequency network (SFN) 400 according to embodiments of the disclosure. For simplicity, a single BS 102 (e.g., BS 102 of FIG. 1), two TRPs 405, and one UE 104 (e.g., UE 104 of FIG. 1) are illustrated, but any fewer or more than two TRPs 405 and more than one UE 104 are possible according to aspects of the present disclosure. BS 102 may rely upon one or more of the TRPs 405 to communicate with the UE 104 (e.g., the TRPs 405 may pass communications received from the UE 104 to the BS 102 to be processed).

A UE 104 traveling on a high-speed train (or at high speed generally) may quickly move out of the coverage range of a single BS 102. To provide continued connectivity to the UE 104, a number of TRPs 405 may be connected via links 404 (e.g., fiber) to the BS 102 and placed at various points along the path of a railway. For example, the first TRP 405a is illustrated as connected to the BS 102 via a first link 404a and the second TRP 405b is connected to the BS 102 via a second link 404b. As the UE 104 moves along the railway it may transition between one or more TRPs 405. As illustrated, UE 104 may be in range of, and communicating with, the first TRP 405a and the second TRP 405b.

TRPs 405 may transmit reference signals (e.g., a tracking reference signal (TRS)) to the UE 104, which as discussed, may be used by the UE 104 for signal/channel quality estimation and/or for Doppler estimation. In one example, each TRP may transmit a separate TRS. For example, where second TRP 405b is the anchor TRP, the second TRP 405b may transmit TRS 2 (e.g., with no pre-compensation), and the first TRP 405b may transmit TRS 1 (e.g., pre-compensated).

In another example, multiple TRPs may transmit the same TRS. For example, both first TRP 405a and second TRP 405b may transmit TRS 1 with corresponding pre-compensation. In certain aspects, such as where second TRP 405b is the anchor TRP, second TRP 405b also transmits another TRS 2 (e.g., with no pre-compensation). Each TRS may be associated with a TCI state, as further discussed herein.

As illustrated, in an example, the first TRP 405a may transmit a first TRS 406a using a first beam 408a and TRP second 405b may transmit a second TRS 406b using a second beam 408b.

Each TRS 406 may be associated with a TCI state, from which the UE 104 may derive time, frequency, and/or spatial properties of a signal for use in demodulating data (e.g., on the physical downlink shared channel) quasi-colocated (QCL'd) with the reference signal. For example, the BS 102 may control multiple TRPs, including the first TRP 405a and the second TRP 405b, along the path of the track. The BS 102 may determine a first TCI state for the first TRS 406a and a second TCI state for the second TRS 406b. The existence of the two TRPs 405 may remain invisible to the UE 104 when using SFN, because both TRPs transmit the TRS on the same time/frequency resources.

In certain aspects, one TCI state/TRS, can be associated with one set of parameters {average delay, delay spread} and another TCI state/TRS, can be associated with another set of parameters {average delay, delay spread, Doppler shift, Doppler spread} (e.g., QCL-TypeA). In certain such aspects, certain Doppler parameters {Doppler shift, Doppler spread} are derived from/estimated based on only TCI state, while other Delay domain parameters {average delay, delay spread} are derived from/estimated based on both TCI states.

In certain other aspects, one TCI state/TRS, can be associated with one set of parameters {average delay, delay spread} and another TCI state/TRS, can be associated with another set of parameters {Doppler shift, Doppler spread} (e.g., QCL-TypeB). In certain such aspects, certain Doppler parameters {Doppler shift, Doppler spread} are derived from/estimated based on one TCI state, while other Delay domain parameters {average delay, delay spread} are derived from/estimated based on the other TCI state.

As the UE 104 moves away from the first TRP 405a and toward the second TRP 405b, the Doppler effect may cause the UE 104 to perceive the first TRS 406a as being transmitted on a lower frequency than it is actually transmitted on, and the second TRS 406b as being transmitted at a higher frequency than it is actually transmitted on. This may cause enough frequency shift that it falls outside the pull-in range of the UE's 104 tracking loop.

Figure 5:
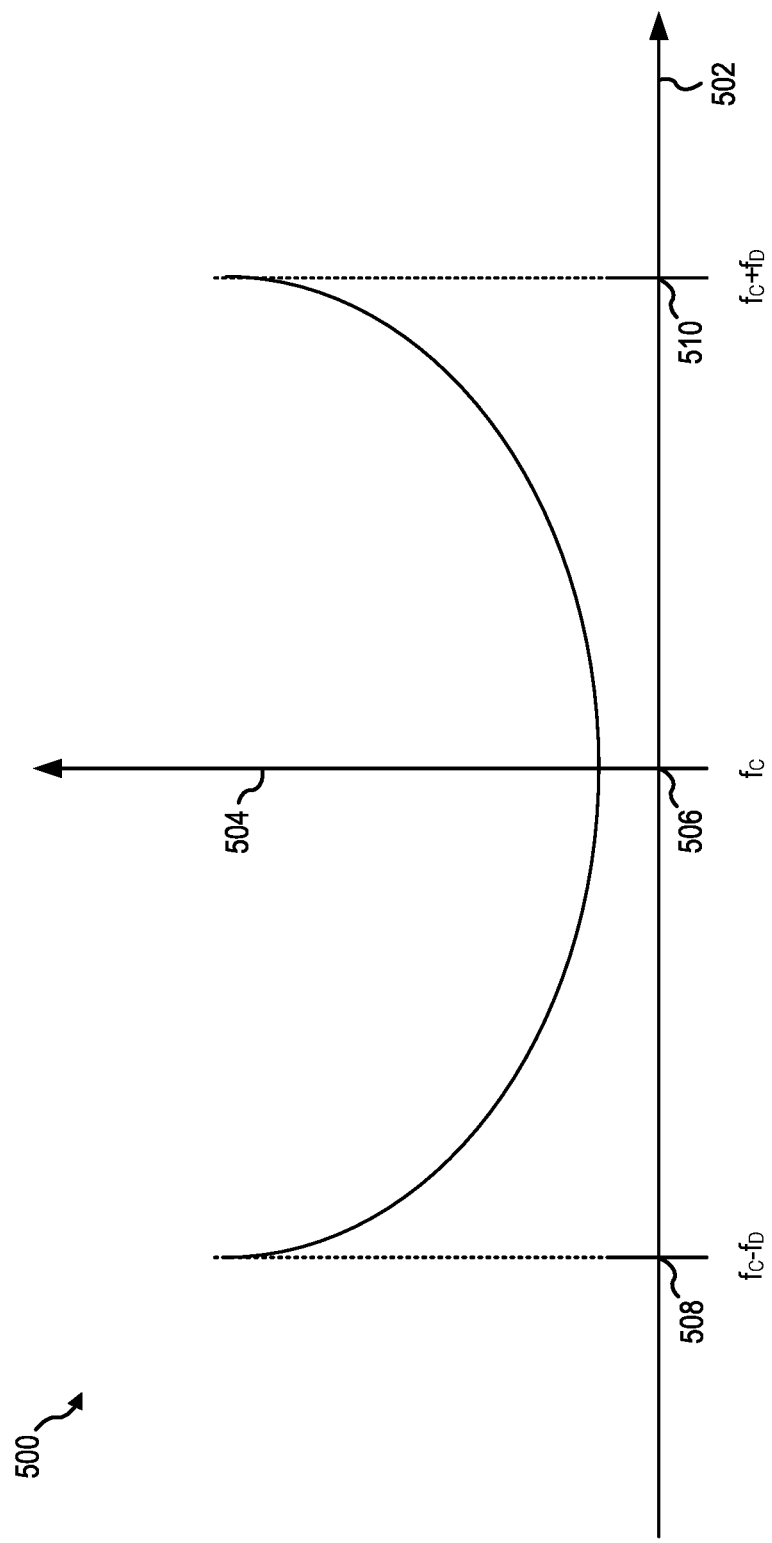
FIG. 5 is a schematic illustrating a Doppler power spectral density according to certain aspects of the disclosure.
Figure 6:
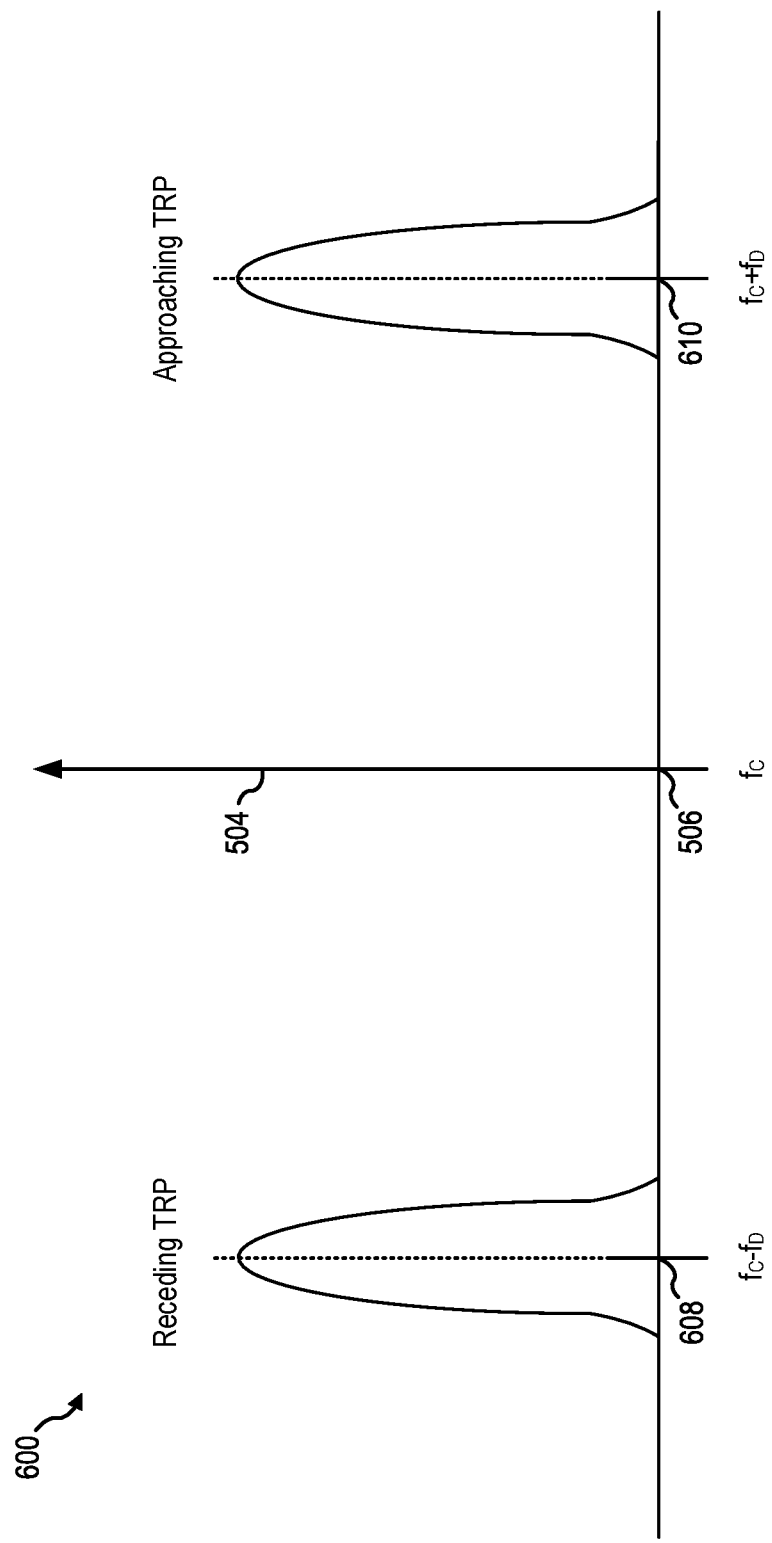
FIG. 6 is a schematic illustrating a Doppler power spectral density according to certain aspects of the disclosure.

For example, turning now to FIGS. 5 and 6, FIG. 5 illustrates a Doppler power spectral density (PSD) model 500 for a signal (e.g., a TRS) transmitted from a single source (e.g., from one or more of the first TRP 405a or the second TRP 405b, originating at the BS 102, or from multiple TRPs 405 in an SFN) and received by the UE 104 according to aspects of the present disclosure. The X-axis 502 represents the frequency shift from the carrier, and the Y-axis 504 represents the Doppler PSD. A center frequency (fc) represents the central (expected) frequency, and $f_D$ represents the maximum Doppler shift. A first point 506 is the PSD at the center frequency, while a second point 508 illustrates the PSD when the frequency is shifted downward by $f_D$, and a third point 510 illustrates the PSD when the frequency is shifted upward by $f_D$. The Doppler PSD model 500 is based on Clarke's model, which assumes rich scattering around the UE's 104 antenna upon reception. This may be applicable in scenarios where the UE 104 is receiving signals in one or more sub-6 GHz bands, and therefore lower Doppler shift (e.g., due to the lower carrier frequency) with corresponding better pull-in range for the UE's 104 tracking loop.

In contrast, FIG. 6 illustrates the Doppler PSD 600 in an HST SFN for a downlink signal (e.g., a TRS) transmitted by two TRPs 405 (and originating at a BS 102) and received by a UE 104 where there is a larger Doppler shift (e.g., due to higher velocity and/or higher carrier frequency e.g. in the mmW bands). Due to the high directionality of the beams (line-of-sight dominant) and low frequency selectivity, the Doppler spread is narrower. As a result of these characteristics, there are effectively two copies of the PSD curve, one centered at a first point 608 corresponding to the receding TRP 405 (e.g., the first TRP 405a of FIG. 4), and one centered at a second point 610 corresponding to the TRP 405 (e.g., the second TRP 405b of FIG. 4) that UE 104 is moving toward. Due to the high frequency and high speed, the Doppler spread is greater than what is shown in FIG. 5. The larger Doppler spread in the HST SFN scenario of FIG. 6 makes it difficult for the UE 104 to receive the TRS using existing TRS structures, without incurring significant search and processing overhead, and possibly renders the UE 104 unable to recover the TRS if the Doppler shift pushes the copies outside the pull-in range of the UE's 104 tracking loop. Accordingly, the TRP(s) 405 may apply one or more frequency pre-compensation values before transmitting the TRSs so that they are within the pull-in range of the UE 104.

Examples of UE-Aided Pre-Compensation

Figure 7:
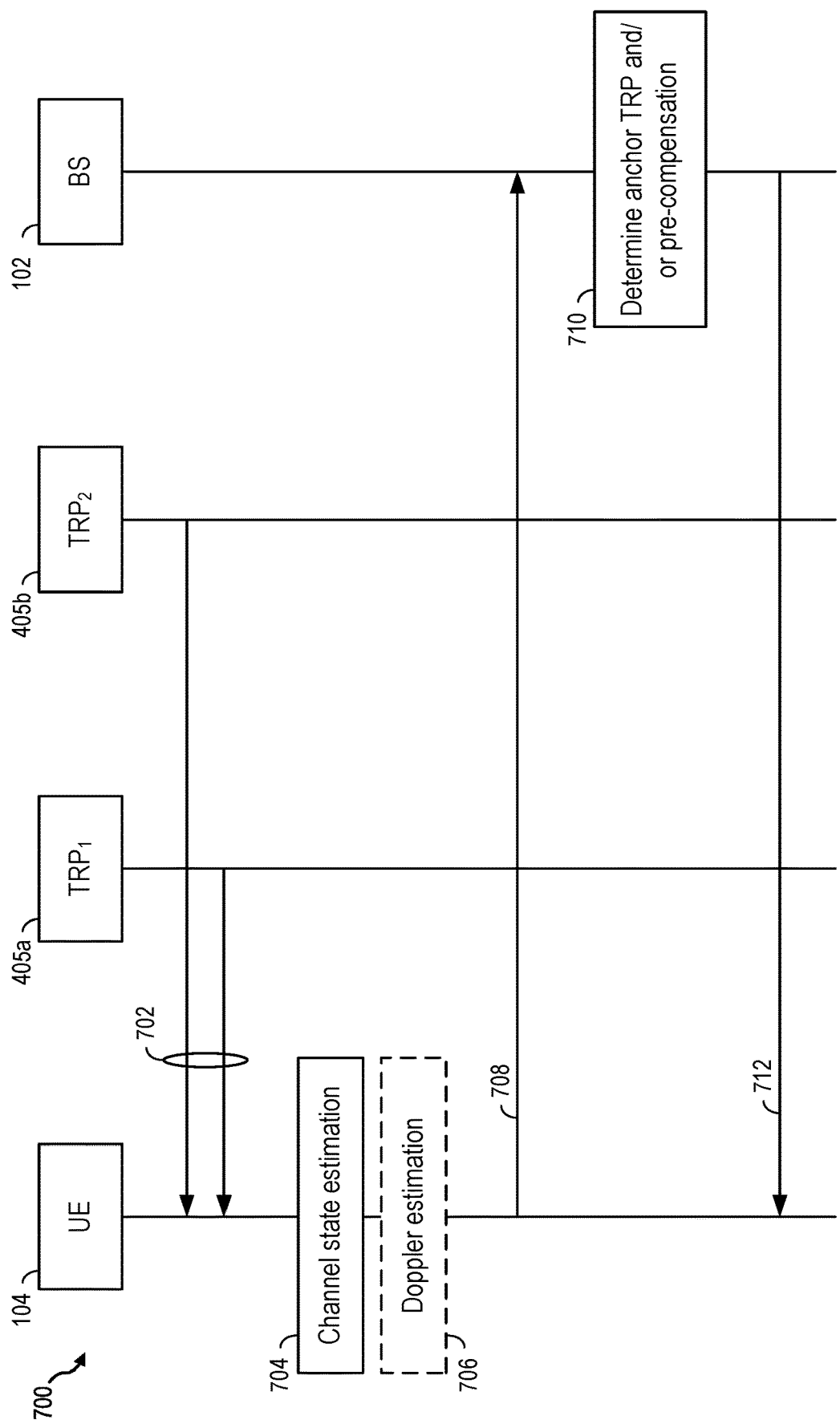
FIG. 7 is a call-flow diagram illustrating example communications between a user equipment (UE), transmission reception points (TRPs), and a base station (BS) according to certain aspects of the disclosure.

FIG. 7 is a call-flow diagram 700 illustrating example wireless communications between a UE 104, two TRPs 405, and a BS 102 in a high speed train (HST) single frequency network (SFN) scenario. It should be noted that the illustrated communications may include any fewer or more than two TRPs 405 and more than one UE 104, according to aspects of the present disclosure. The two TRPs 405 may be associated with the BS 102, and the BS 102 may rely upon one or more of the TRPs 405 to communicate with the UE 104 (e.g., one or more of the TRPs 405 may pass communications from the UE 104 to the BS 102).

Initially, the first TRP 405a and the second TRP 405b may transmit a plurality of downlink transmissions 702 to the UE 104 over a corresponding plurality of communication links. For example, the first TRP 405a may communicate with the UE 104 over a first communication link, and the second TRP 405b may communicate with the UE 104 over a second communication link, wherein the first communication link and the second communication link share the same carrier frequency. Each of the downlink transmissions 702 may include at least one reference signal (e.g., tracking reference signal (TRS), demodulation reference signal (DMRS), synchronization signal block (SSB), channel state information reference signal (CSI-RS), etc.). In some examples, each TRP 405 may transmit a reference signal over its respective communication link, wherein the reference signal of each TRP is configured at the TRP 405 by the BS 102. For example, the reference signal may be a TRS (which may also be a CSI-RS with TRS information) that indicates to the UE 104 the quasi-colocation (QCL) type, which the UE 104 may use to measure, for example, Doppler shift, Doppler spread, average delay, and/or delay spread associated with each communication link.

The UE 104 may receive the downlink transmissions 702 and perform a first process 704 that includes channel state estimation to generate channel state information (CSI) reports based on the reference signals. In some examples, the CSI reports may include one or more channel quality parameters, such as a received signal strength indicator (RSSI), a received signal received power (RSRP), a received signal received quality (RSRQ), signal to interference plus noise ratio (SINR), or any other suitable parameters corresponding to one or more of the reference signals associated with the downlink transmissions 702.

The UE 104 may also perform a second process 706 that includes Doppler estimation. For example, the UE 104 may determine that a reference signal transmitted on the first TRP 405a is received at a lower frequency than the reference signal is actually transmitted on, and another reference signal transmitted on the second TRP 405b is received at a higher frequency than it is actually transmitted on. In another example, the UE may not have information regarding the actual frequencies of transmission of the reference signals and instead may determine that one RS used for SFN is received at a frequency different (e.g., lower) than another RS that is used for the SFN operation. More specifically, the UE 104 may determine one or more of a Doppler shift and/or Doppler spread of a first reference signal transmitted over the first communication link, a Doppler shift and/or Doppler spread of a second reference signal transmitted over the second communication link, an average delay and/or delay spread of the first reference signal transmitted over the first communication link, or an average delay and/or delay spread of the second reference signal transmitted over the second communication link.

In some examples, the UE 104 may perform Doppler estimation if the UE 104 is configured to communicate with the TRPs 405 using a frequency-division duplex (FDD) method of communication. Because the frequency used for downlink transmission is different from the frequency used for uplink transmission in an FDD communication, the UE 104 may be capable of making a more accurate estimation of a Doppler effect because the UE 104 may directly experience the Doppler spread as a result of the plurality of downlink transmissions 702. It should be noted that, in certain aspects, the UE 104 may refrain from performing Doppler estimation if the BS 102 performs the process instead. In some examples, the BS 102 may perform Doppler estimation if the UE 104 is configured to communicate with the TRPs 405 using a time-division duplex (TDD) method of communication. In this example, the BS 102 may perform Doppler estimation based on a reference signal transmitted by the UE 104 in an uplink communication.

The UE 104 may transmit an uplink communication 708 to the BS 102 (e.g., via one or more of the TRPs 405), wherein the uplink communication 708 includes an indication that one of the first communication link or the second communication link is preferred by the UE 104 as a communication link for demodulation of downlink signaling. That is, the UE 104 may indicate that a particular one of the first communication link or the second communication link is a higher quality link relative to the other, and that the TRP 405 associated with the higher quality link should function as the anchor TRP for the UE 104 (e.g., the TRP associated with the higher quality communication link may be better suited to function as an anchor TRP).

In an example where the UE 104 performs Doppler estimation, the uplink communication 708 may include a feedback report (e.g., CSI report) that includes both of the indication of the preferred communication link, and an indication of the Doppler estimation. In one example, the indication of the preferred communication link is an explicit indication (e.g., one or more bits set by the UE in the feedback report) identifying the TRP 405 associated with the link having the highest quality. In another example, the indication of the preferred communication link is an indication of an actual value of a UE-measured channel quality parameter (e.g., actual signal quality) of the preferred communication link. The content of uplink communication 708 may be any suitable content discussed herein, and when uplink communication 708 may be communicated may be according to any suitable timing or triggering event as discussed herein.

In yet another example, the indication of the preferred communication link may be implicitly indicated to the BS 102 using the feedback report. Here, the feedback report may include both an actual value of the preferred communication link, and a relative value of one or more other communication links. The relative value of the other communication link(s) may include a signal quality difference between the preferred link and each of the other link(s) having lower signal quality than the preferred communication link.

In an example where the UE 104 does not perform Doppler estimation (e.g., the BS 102 performs Doppler estimation based on UE 104 uplink transmissions), the uplink communication 708 may transmit an indication of the preferred communication link via an uplink control information (UCI) message, a medium-access control (MAC) control element (MAC-CE), or any other suitable uplink signaling.

In another example, the uplink communication 708 may transmit an implicit indication of the preferred communication link via an uplink reference signal. In this example, the uplink reference signal (e.g., SRS) may provide an implicit indication based on resource parameters used for transmitting the uplink reference signal. The UE 104 may be preconfigured with a pool of resource parameters, wherein each of the resource parameters maps to a particular communication link. The resource parameters and the mapping may be configured at the UE 104 by the BS 102, one of the TRPs 405, or during a manufacturing phase of the UE 104. The resource parameters may include a one or more of reference signal sequences, reference signal resource allocations, reference signal density, and/or any other suitable reference signal parameters. Thus, in this example, the UE 104 may measure downlink signals 702 to determine which communication link has the highest quality, then select a particular reference signal defined by a resource parameter that maps to highest quality communication link, and transmit the uplink communication 708 with the selected reference signal.

In one example, the UE 104 may indicate, via the uplink communication 708, a preferred communication link or TRP 405 to function as an anchor TRP by transmitting an indication of a channel quality parameter for each of the first communication link and the second communication link used to carry the downlink signals 702. In this example, the BS 102 may use the channel quality parameters to determine a delta value that reflects a different between the channel quality parameters, and then map the delta value to a particular pre-compensation value. Here, because the pre-compensation value is mapped to the delta value, the BS 102 may not use a Doppler estimation to determine the pre-compensation value. In some examples, actual values and/or relative values of the channel quality parameters may be indicated via a bit in a feedback report (e.g., CSI feedback report).

In response to the uplink communication 708, the BS 102 may perform a process 710 for determining an anchor TRP and/or a frequency pre-compensation of one or more of the first communication link or the second communication link. In some examples, the BS 102 may determine the frequency pre-compensation based on both a Doppler estimate (made by either or both of the UE 104 or BS 102) and the additional information provided by the UE 104 in the uplink communication 708. In one example, the BS 102 may map the channel quality parameters to a particular pre-compensation, and transmit an indication of the pre-compensation to a TRP 405. The TRP 405 may then begin transmitting downlink signals using the indicated pre-compensation.

The BS 102 may determine the anchor TRP based on the channel quality parameters received from the UE 104. In some examples, the BS 102 may determine the UE's preferred TRP (e.g., the TRP 405 associated with the UE's 104 preferred communication link) will function as an anchor TRP. However, the BS 102 may determine to use another TRP based on Doppler and/or channel quality estimates made by the BS 102.

It should be noted that the UE 104 may not receive an ACK/NACK indication from the BS in response to its uplink communication 708. For example, if the uplink communication indicates the UE's 104 preferred communication link via UCI, the UE 104 may not know whether the UCI was received by the BS 102. Thus, in a downlink communication 712, the BS 102 may transmit an indication of the anchor TRP via a scheduling downlink control information (DCI) message, a MAC-CE (e.g., a MAC-CE activation message that activates the two TCI states for downlink transmissions from the TRPs 405), or any other suitable downlink communication. In some examples, the indication of the anchor TRP may include an explicit one or more bits indicating which TCI state is associated with the anchor TRP. In another example, the indication of the anchor TRP may be implicit, and based on an order in which the TCIs are listed in the MAC-CE message (e.g., a first TCI corresponds to the anchor TRP).

Example Methods

Figure 8:
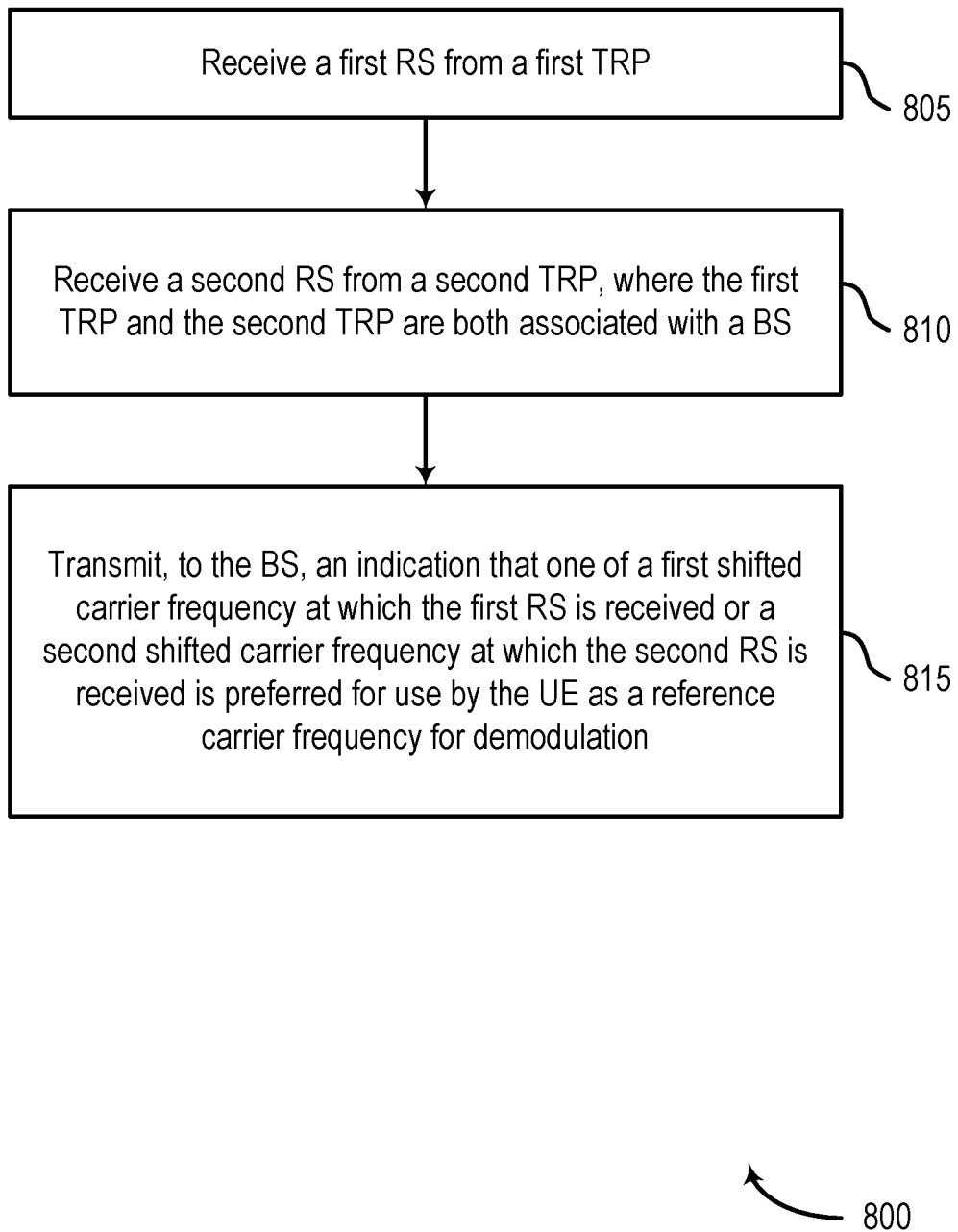
FIG. 8 shows an example method for indication of preferred reference carrier frequency for demodulation according to aspects of the present disclosure.

FIG. 8 shows an example of a method 800 for indication of preferred reference carrier frequency for demodulation according to aspects of the present disclosure. In some aspects, a user equipment, such as UE 104 of FIGS. 1 and 2, or processing system 1005 of FIG. 10, may perform the method 800.

At operation 805, the system receives a first RS from a first TRP. In some cases, the operations of this step refer to, or may be performed by, DL RS reception circuitry as described with reference to FIG. 10.

At operation 810, the system receives a second RS from a second TRP, where the first TRP and the second TRP are both associated with a BS (e.g., are connected to the BS as RRHs of the BS). In some cases, the operations of this step refer to, or may be performed by, DL RS reception circuitry as described with reference to FIG. 10.

At operation 815, the system transmits, to the BS, an indication that one of a first shifted carrier frequency at which the first RS is received or a second shifted carrier frequency at which the second RS is received is preferred for use by the UE as a reference carrier frequency for demodulation. In some cases, the operations of this step refer to, or may be performed by, reference carrier frequency circuitry as described with reference to FIG. 10.

In some aspects, the indication is transmitted in a feedback report comprising Doppler feedback based on the first RS and the second RS. In some aspects, the Doppler feedback comprises one or more of Doppler shift of the first RS as measured at the UE, Doppler spread of the first RS as measured at the UE, average delay of the first RS as measured at the UE, or delay spread of the first RS as measured at the UE, and wherein the Doppler feedback comprises one or more of Doppler shift of the second RS as measured at the UE, Doppler spread of the second RS as measured at the UE, average delay of the second RS as measured at the UE, or delay spread of the second RS as measured at the UE. In some aspects, the feedback report comprises a CSI report.

In some aspects, the indication consists of a single bit. In some aspects, the indication comprises an implicit indication based on RS receive power feedback for the first RS and RS receive power feedback for the second RS.

In some aspects, the method 800 includes transmitting an uplink RS to the first TRP and the second TRP, wherein the indication is transmitted separately from the uplink RS.

In some aspects, the method 800 includes transmitting an uplink RS to the first TRP and the second TRP, wherein the indication comprises an implicit indication based on resource parameters used for transmitting the uplink RS.

In some aspects, the first RS and the second RS are received in a first time period (e.g., symbol, subframe, slot, etc.).

In some aspects, the method 800 includes receiving, from the BS, a second indication of a frequency for the UE to use as the reference carrier frequency for demodulation. In some aspects, the second indication comprises one or more bits indicating a transmission configuration indicator state associated with the frequency. In some aspects, the second indication comprises an implicit indication comprising an order in which a transmission configuration indicator state associated with the frequency is listed in an activation message.

Figure 9:
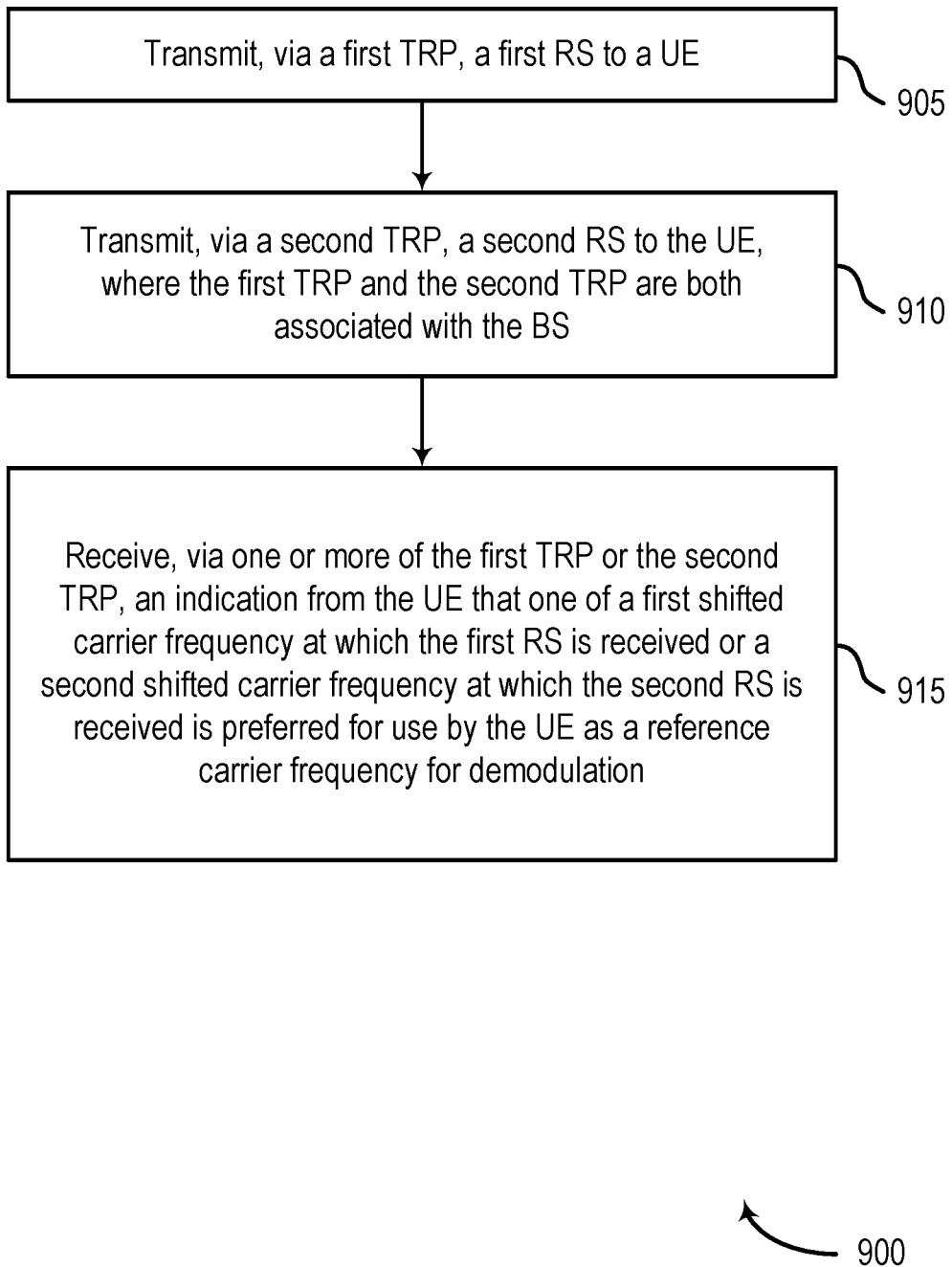
FIG. 9 shows an example method for indication of preferred reference carrier frequency for demodulation according to aspects of the present disclosure.

FIG. 9 shows an example of a method 900 for indication of preferred reference carrier frequency for demodulation according to aspects of the present disclosure. In some aspects, a base station, such as base station 102 of FIGS. 1 and 2, or processing system 1105 of FIG. 11, may perform the method 900.

At operation 905, the system transmits, via a first TRP, a first RS to a UE. In some cases, the operations of this step refer to, or may be performed by, a DL RS transmission circuitry as described with reference to FIG. 11.

At operation 910, the system transmits, via a second TRP, a second RS to the UE, where the first TRP and the second TRP are both associated with the BS. In some cases, the operations of this step refer to, or may be performed by, a DL RS transmission circuitry as described with reference to FIG. 11.

At operation 915, the system receives, via one or more of the first TRP or the second TRP, an indication from the UE that one of a first shifted carrier frequency at which the first RS is received or a second shifted carrier frequency at which the second RS is received is preferred for use by the UE as a reference carrier frequency for demodulation. In some cases, the operations of this step refer to, or may be performed by, a UE reference carrier frequency circuitry as described with reference to FIG. 11.

In some aspects, the indication comprises a feedback report comprising Doppler feedback based on the first RS and the second RS. In some aspects, the Doppler feedback comprises one or more of Doppler shift of the first RS as measured at the UE, Doppler spread of the first RS as measured at the UE, average delay of the first RS as measured at the UE, or delay spread of the first RS as measured at the UE, and wherein the Doppler feedback comprises one or more of Doppler shift of the second RS as measured at the UE, Doppler spread of the second RS as measured at the UE, average delay of the second RS as measured at the UE, or delay spread of the second RS as measured at the UE. In some aspects, the feedback report comprises a CSI report.

In some aspects, the indication consists of a single bit. In some aspects, the indication comprises an implicit indication based on RS receive power feedback for the first RS and RS receive power feedback for the second RS.

In some aspects, the method 900 includes receiving, via one or more of the first TRP or the second TRP, an uplink RS from the UE. Some examples further include calculating, based on the uplink RS, one or more of a Doppler shift or a Doppler spread of one or more of the first RS or the second RS.

In some aspects, the method 900 includes receiving, via one or more of the first TRP or the second TRP, an uplink RS from the UE, wherein the indication comprises an implicit indication based on resource parameters used for transmission of the uplink RS.

In some aspects, the first RS and the second RS are transmitted in a first time period (e.g., symbol, slot, subframe, etc.).

In some aspects, the method 900 includes transmitting a second indication to the UE, the second indication configured to provide the UE with a frequency to use as the reference carrier frequency for demodulation. In some aspects, the second indication comprises one or more bits indicating a transmission configuration indicator state associated with the frequency. In some aspects, the second indication comprises an implicit indication comprising an order in which a transmission configuration indicator state associated with the frequency is listed in an activation message.

Example Wireless Communication Devices

Figure 10:
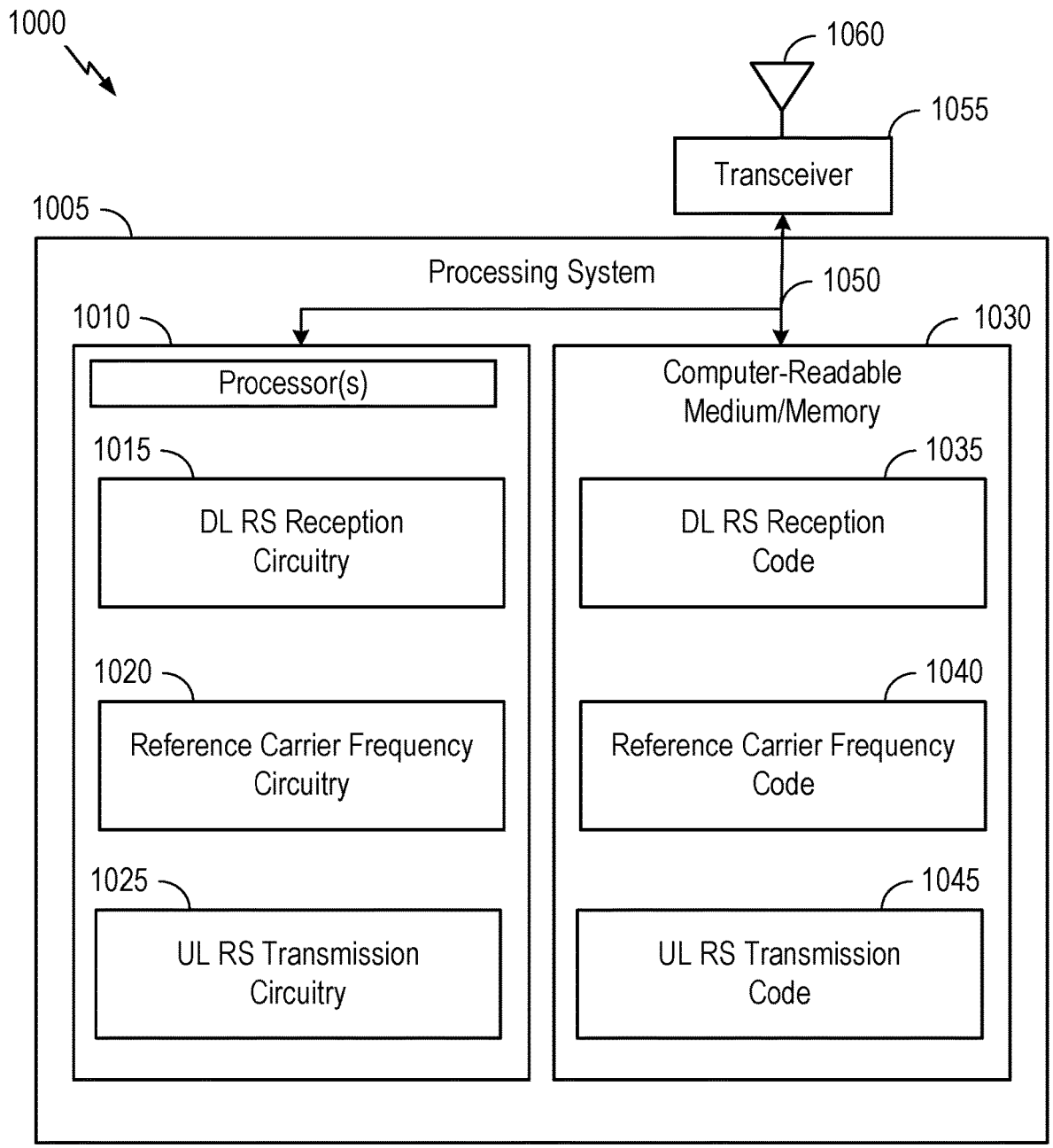
FIG. 10 shows an example of a communications device according to aspects of the present disclosure.

FIG. 10 depicts an example communications device 1000 that includes various components operable, configured, or adapted to perform operations for the techniques disclosed herein, such as the operations depicted and described with respect to FIGS. 4-8. In some examples, communication device may be a user equipment 104 as described, for example with respect to FIGS. 1 and 2.

Communications device 1000 includes a processing system 1005 coupled to a transceiver 1055 (e.g., a transmitter and/or a receiver). Transceiver 1055 is configured to transmit (or send) and receive signals for the communications device 1000 via an antenna 1060, such as the various signals as described herein.

Processing system 1005 may be configured to perform processing functions for communications device 1000, including processing signals received and/or to be transmitted by communications device 1000. Processing system 1005 includes one or more processors 1010 coupled to a computer-readable medium/memory 1030 via a bus 1050.

In certain aspects, computer-readable medium/memory 1030 is configured to store instructions (e.g., computer-executable code) that when executed by the one or more processors 1010, cause the one or more processors 1010 to perform the operations illustrated in FIGS. 4-8, or other operations for performing the various techniques discussed herein.

In one aspect, computer-readable medium/memory 1030 includes DL RS reception code 1035, reference carrier frequency code 1040, and UL RS transmission code 1045.

Various components of communications device 1000 may provide means for performing the methods described herein, including with respect to FIGS. 4-8.

In some examples, means for transmitting or sending (or means for outputting for transmission) may include the transceivers 254 and/or antenna(s) 252 of the user equipment 104 illustrated in FIG. 2 and/or transceiver 1055 and antenna 1060 of the communication device in FIG. 10.

In some examples, means for receiving (or means for obtaining) may include the transceivers 254 and/or antenna(s) 252 of the user equipment 104 illustrated in FIG. 2 and/or transceiver 1055 and antenna 1060 of the communication device in FIG. 10.

In some examples, means for receiving and/or transmitting may include various processing system 1105 components, such as: the one or more processors 1010 in FIG. 10, or aspects of the user equipment 104 depicted in FIG. 2, including receive processor 258, transmit processor 264, TX MIMO processor 266, and/or controller/processor 280.

In one aspect, one or more processors 1010 include DL RS reception circuitry 1015, reference carrier frequency circuitry 1020, and UL RS transmission circuitry 1025.

According to some aspects, DL RS reception circuitry 1015 receives a first RS from a first TRP. In some examples, DL RS reception circuitry 1015 receives a second RS from a second TRP, where the first TRP and the second TRP are both associated with a BS. In some aspects, the first RS and the second RS are received in a first time period.

According to some aspects, reference carrier frequency circuitry 1020 transmits, to the B S, an indication that one of a first shifted carrier frequency at which the first RS is received or a second shifted carrier frequency at which the second RS is received is preferred for use by the UE as a reference carrier frequency for demodulation.

In some aspects, the indication is transmitted in a feedback report including Doppler feedback based on the first RS and the second RS. In some aspects, the Doppler feedback includes one or more of Doppler shift of the first RS as measured at the UE, Doppler spread of the first RS as measured at the UE, average delay of the first RS as measured at the UE, or delay spread of the first RS as measured at the UE, and wherein the Doppler feedback comprises one or more of Doppler shift of the second RS as measured at the UE, Doppler spread of the second RS as measured at the UE, average delay of the second RS as measured at the UE, or delay spread of the second RS as measured at the UE. In some aspects, the feedback report includes a CSI report.

In some aspects, the indication includes a bit. In some aspects, the indication includes an implicit indication including reference signal receive power feedback for the first RS and the second RS.

In some examples, reference carrier frequency circuitry 1020 receives, from the BS, a second indication of a frequency for the UE to use as the reference carrier frequency for demodulation. In some aspects, the second indication includes one or more bits indicating a transmission configuration indicator state associated with the frequency. In some aspects, the second indication includes an implicit indication including an order in which a transmission configuration indicator state associated with the frequency is listed in an activation message.

According to some aspects, UL RS transmission circuitry 1025 transmits an uplink RS to the first TRP and the second TRP, where the indication is transmitted separately from the uplink RS. In some examples, UL RS transmission circuitry 1025 transmits an uplink RS to the first TRP and the second TRP, where the indication includes an implicit indication of a preferred reference carrier frequency for demodulation based on resource parameters used for transmitting the uplink RS.

Notably, FIG. 10 is just one example, and many other examples and configurations of communication device are possible.

Figure 11:
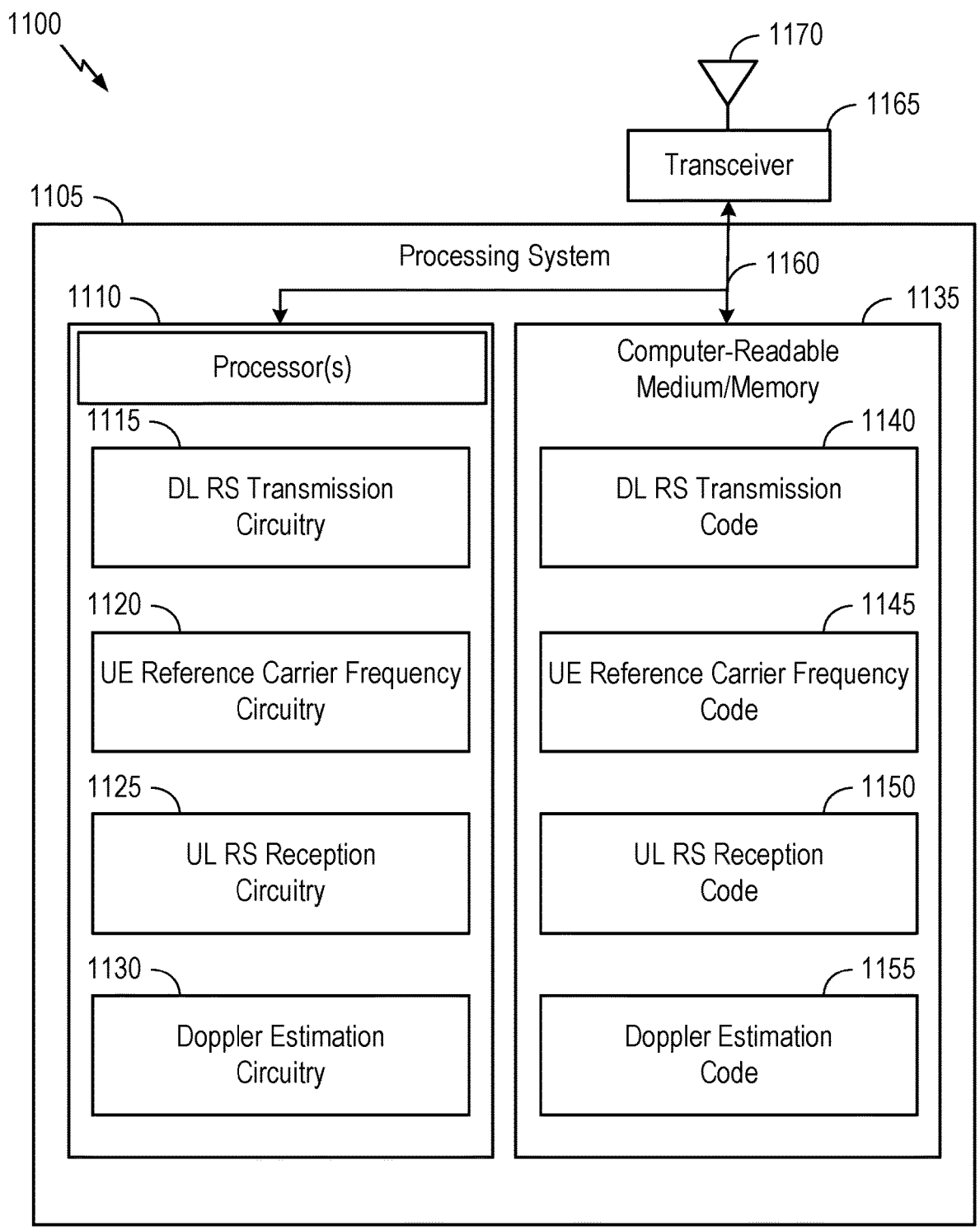
FIG. 11 shows an example of a communications device according to aspects of the present disclosure.

FIG. 11 depicts an example communications device 1100 that includes various components operable, configured, or adapted to perform operations for the techniques disclosed herein, such as the operations depicted and described with respect to FIGS. 4-7 and 9. In some examples, communication device may be a base station 102 as described, for example with respect to FIGS. 1 and 2.

Communications device 1100 includes a processing system 1105 coupled to a transceiver 1165 (e.g., a transmitter and/or a receiver). Transceiver 1165 is configured to transmit (or send) and receive signals for the communications device 1100 via an antenna 1170, such as the various signals as described herein. Processing system 1105 may be configured to perform processing functions for communications device 1100, including processing signals received and/or to be transmitted by communications device 1100.

Processing system 1105 includes one or more processors 1110 coupled to a computer-readable medium/memory 1135 via a bus 1160. Processing system 1105 may be configured to perform processing functions for communications device 1100, including processing signals received and/or to be transmitted by communications device 1100.

In certain aspects, computer-readable medium/memory 1135 is configured to store instructions (e.g., computer-executable code) that when executed by the one or more processors 1110, cause the one or more processors 1110 to perform the operations illustrated in FIGS. 4-7 and 9, or other operations for performing the various techniques discussed herein.

In one aspect, computer-readable medium/memory 1135 includes DL RS transmission code 1140, UE reference carrier frequency code 1145, UL RS reception code 1150, and Doppler estimation code 1155.

Various components of communications device 1100 may provide means for performing the methods described herein, including with respect to FIGS. 4-7 and 9.

In some examples, means for transmitting or sending (or means for outputting for transmission) may include the transceivers 232 and/or antenna(s) 234 of the base station 102 illustrated in FIG. 2 and/or transceiver 1165 and antenna 1170 of the communication device in FIG. 11.

In some examples, means for receiving (or means for obtaining) may include the transceivers 232 and/or antenna(s) 234 of the base station 102 illustrated in FIG. 2 and/or transceiver 1165 and antenna 1170 of the communication device in FIG. 11

In some examples, means for transmitting, receiving, and/or calculating may include various processing system 1105 components, such as: the one or more processors 1110 in FIG. 11, or aspects of the base station 102 depicted in FIG. 2, including receive processor 238, transmit processor 220, TX MIMO processor 230, and/or controller/processor 240.

In one aspect, one or more processors 1110 includes DL RS transmission circuitry 1115, UE reference carrier frequency circuitry 1120, UL RS reception circuitry 1125, and Doppler estimation circuitry 1130.

According to some aspects, DL RS transmission circuitry 1115 transmits, via a first TRP, a first RS to a UE. In some examples, DL RS transmission circuitry 1115 transmits, via a second TRP, a second RS to the UE, where the first TRP and the second TRP are both associated with the BS. In some aspects, the first RS and the second RS are transmitted in a first time period.

According to some aspects, UE reference carrier frequency circuitry 1120 receives, via one or more of the first TRP or the second TRP, an indication from the UE that one of a first shifted carrier frequency at which the first RS is received or a second shifted carrier frequency at which the second RS is received is preferred for use by the UE as a reference carrier frequency for demodulation. In some aspects, the indication includes a feedback report including Doppler feedback based on the first RS and the second RS. In some aspects, the Doppler feedback includes one or more of Doppler shift of the first RS as measured at the UE, Doppler spread of the first RS as measured at the UE, average delay of the first RS as measured at the UE, or delay spread of the first RS as measured at the UE, and wherein the Doppler feedback comprises one or more of Doppler shift of the second RS as measured at the UE, Doppler spread of the second RS as measured at the UE, average delay of the second RS as measured at the UE, or delay spread of the second RS as measured at the UE. In some aspects, the feedback report includes a CSI report.

In some aspects, the indication includes a bit. In some aspects, the indication includes an implicit indication including reference signal receive power feedback for the first RS and the second RS. In some examples, UE reference carrier frequency circuitry 1120 transmits a second indication to the UE, the second indication configured to provide the UE with a frequency to use as the reference carrier frequency for demodulation. In some aspects, the second indication includes one or more bits indicating a transmission configuration indicator state associated with the frequency. In some aspects, the second indication includes an implicit indication including an order in which a transmission configuration indicator state associated with the frequency is listed in an activation message.

According to some aspects, UL RS reception circuitry 1125 receives, via one or more of the first TRP or the second TRP, an uplink RS from the UE. In some examples, UL RS reception circuitry 1125 receives, via one or more of the first TRP or the second TRP, an uplink RS from the UE, where the indication includes an implicit indication based on resource parameters used for transmission of the uplink RS.

According to some aspects, Doppler estimation circuitry 1130 calculates, based on the uplink RS, one or more of a Doppler shift or a Doppler spread of one or more of the first RS or the second RS.

Notably, FIG. 11 is just one example, and many other examples and configurations of communication device are possible.

Example Clauses

Implementation examples are described in the following numbered clauses:

Clause 1: A method of wireless communication by a UE, comprising: receiving a first RS from a first TRP; receiving a second RS from a second TRP, wherein the first TRP and the second TRP are both associated with a BS; and transmitting, to the BS, an indication that one of a first shifted carrier frequency at which the first RS is received or a second shifted carrier frequency at which the second RS is received is preferred for use by the UE as a reference carrier frequency for demodulation.

Clause 2: In aspects of clause 1, the indication is transmitted in a feedback report comprising Doppler feedback based on the first RS and the second RS.

Clause 3: In aspects of clause 2, the Doppler feedback comprises one or more of Doppler shift of the first RS as measured at the UE, Doppler spread of the first RS as measured at the UE, average delay of the first RS as measured at the UE, or delay spread of the first RS as measured at the UE, and wherein the Doppler feedback comprises one or more of Doppler shift of the second RS as measured at the UE, Doppler spread of the second RS as measured at the UE, average delay of the second RS as measured at the UE, or delay spread of the second RS as measured at the UE.

Clause 4: In aspects of any one of clauses 2-3, the feedback report comprises a CSI report.

Clause 5: In aspects of any one of clauses 1-4, the indication consists of a single bit.

Clause 6: In aspects of any one of clauses 1-4, the indication comprises an implicit indication based on RS receive power feedback for the first RS and RS receive power feedback for the second RS.

Clause 7: In aspects of clause 1, the method further comprises: transmitting an uplink RS to the first TRP and the second TRP, wherein the indication is transmitted separately from the uplink RS.

Clause 8: In aspects of clause 1, the method further comprises: transmitting an uplink RS to the first TRP and the second TRP, wherein the indication comprises an implicit indication based on resource parameters used for transmitting the uplink RS.

Clause 9: In aspects of any one of clauses 1-8, the first RS and the second RS are received in a first time period.

Clause 10: In aspects of any one of clauses 1-9, the method further comprises: receiving, from the BS, a second indication of a frequency for the UE to use as the reference carrier frequency for demodulation.

Clause 11: In aspects of clause 10, the second indication comprises one or more bits indicating a transmission configuration indicator state associated with the frequency.

Clause 12: In aspects of clause 10, the second indication comprises an implicit indication comprising an order in which a transmission configuration indicator state associated with the frequency is listed in an activation message.

Clause 13: A method of wireless communication by a BS, comprising: transmitting, via a first TRP, a first RS to a UE; transmitting, via a second TRP, a second RS to the UE, wherein the first TRP and the second TRP are both associated with the BS; and receiving, via one or more of the first TRP or the second TRP, an indication from the UE that one of a first shifted carrier frequency at which the first RS is received or a second shifted carrier frequency at which the second RS is received is preferred for use by the UE as a reference carrier frequency for demodulation.

Clause 14: In aspects of clause 13, the indication comprises a feedback report comprising Doppler feedback based on the first RS and the second RS.

Clause 15: In aspects of clause 14, the Doppler feedback comprises one or more of Doppler shift of the first RS as measured at the UE, Doppler spread of the first RS as measured at the UE, average delay of the first RS as measured at the UE, or delay spread of the first RS as measured at the UE, and wherein the Doppler feedback comprises one or more of Doppler shift of the second RS as measured at the UE, Doppler spread of the second RS as measured at the UE, average delay of the second RS as measured at the UE, or delay spread of the second RS as measured at the UE.

Clause 16: In aspects of any one of clauses 14-15, the feedback report comprises a CSI report.

Clause 17: In aspects of any one of clauses 13-16, the indication consists of a single bit.

Clause 18: In aspects of any one of clauses 13-16, the indication comprises an implicit indication based on RS receive power feedback for the first RS and RS receive power feedback for the second RS.

Clause 19: In aspects of clause 13, the method further comprises: receiving, via one or more of the first TRP or the second TRP, an uplink RS from the UE. Some examples further include calculating, based on the uplink RS, one or more of a Doppler shift or a Doppler spread of one or more of the first RS or the second RS.

Clause 20: In aspects of clause 13, the method further comprises: receiving, via one or more of the first TRP or the second TRP, an uplink RS from the UE, wherein the indication comprises an implicit indication based on resource parameters used for transmission of the uplink RS.

Clause 21: In aspects of any one of clauses 13-20, the first RS and the second RS are transmitted in a first time period.

Clause 22: In aspects of any one of clauses 13-21, the method further comprises: transmitting a second indication to the UE, the second indication configured to provide the UE with a frequency to use as the reference carrier frequency for demodulation.

Clause 23: In aspects of clause 22, the second indication comprises one or more bits indicating a transmission configuration indicator state associated with the frequency.

Clause 24: In aspects of clause 22, the second indication comprises an implicit indication comprising an order in which a transmission configuration indicator state associated with the frequency is listed in an activation message.

Clause 25: A processing system, comprising: a memory comprising computer-executable instructions; one or more processors configured to execute the computer-executable instructions and cause the processing system to perform a method in accordance with any one of Clauses 1-24.

Clause 26: A processing system, comprising means for performing a method in accordance with any one of Clauses 1-24.

Clause 27: A non-transitory computer-readable medium storing computer-executable instructions that, when executed by one or more processors of a processing system, cause the processing system to perform a method in accordance with any one of Clauses 1-24.

Clause 28: A computer program product embodied on a computer-readable storage medium comprising code for performing a method in accordance with any one of Clauses 1-24.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of indication of preferred reference carrier frequency for demodulation in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment (UE), comprising:
a memory; and
one or more processors coupled to the memory and configured to cause the UE to:
receive a first reference signal (RS) from a first transmission reception point (TRP);
receive a second RS from a second TRP, wherein the first TRP and the second TRP are both associated with a base station (BS);
transmit, to the BS, an indication that one of a first shifted carrier frequency at which the first RS is received or a second shifted carrier frequency at which the second RS is received is preferred for use by the UE as a reference carrier frequency for demodulation, and
receive, from the BS, a second indication of a frequency for the UE to use as the reference carrier frequency for demodulation, and
wherein the second indication comprises an implicit indication comprising an order in which a transmission configuration indicator state associated with the frequency is listed in an activation message.

2. The UE of claim 1, wherein the indication is transmitted in a feedback report comprising Doppler feedback based on the first RS and the second RS.

3. The UE of claim 2, wherein the Doppler feedback comprises one or more of Doppler shift of the first RS as measured at the UE, Doppler spread of the first RS as measured at the UE, average delay of the first RS as measured at the UE, or delay spread of the first RS as measured at the UE, and wherein the Doppler feedback comprises one or more of Doppler shift of the second RS as measured at the UE, Doppler spread of the second RS as measured at the UE, average delay of the second RS as measured at the UE, or delay spread of the second RS as measured at the UE.

4. The UE of claim 2, wherein the feedback report comprises a channel state information (CSI) report.

5. The UE of claim 1, wherein the indication consists of a single bit.

6. The UE of claim 1, wherein the indication comprises an implicit indication based on RS receive power feedback for the first RS and RS receive power feedback for the second RS.

7. The UE of claim 1, wherein the one or more processors are further configured to cause the UE to transmit an uplink RS to the first TRP and the second TRP, wherein the indication is transmitted separately from the uplink RS.

8. The UE of claim 1, wherein the one or more processors are further configured to cause the UE to transmit an uplink RS to the first TRP and the second TRP, wherein the indication comprises an implicit indication based on resource parameters used for transmitting the uplink RS.

9. The UE of claim 1, wherein the first RS and the second RS are received in a first time period.

10. A base station (BS), comprising:
a memory; and
one or more processors coupled to the memory and configured to cause the BS to:
transmit, via a first transmission reception point (TRP), a first reference signal (RS) to a user equipment (UE);
transmit, via a second TRP, a second RS to the UE, wherein the first TRP and the second TRP are both associated with the BS;
receive, via one or more of the first TRP or the second TRP, an indication from the UE that one of a first shifted carrier frequency at which the first RS was received by the UE or a second shifted carrier frequency at which the second RS was received by the UE is preferred for use by the UE as a reference carrier frequency for demodulation, and
transmit a second indication to the UE, the second indication configured to provide the UE with a frequency to use as the reference carrier frequency for demodulation, and
wherein the second indication comprises an implicit indication comprising an order in which a transmission configuration indicator state associated with the frequency is listed in an activation message.

11. The BS of claim 10, wherein the indication comprises a feedback report comprising Doppler feedback based on the first RS and the second RS.

12. The BS of claim 11, wherein the Doppler feedback comprises one or more of Doppler shift of the first RS as measured at the UE, Doppler spread of the first RS as measured at the UE, average delay of the first RS as measured at the UE, or delay spread of the first RS as measured at the UE, and wherein the Doppler feedback comprises one or more of Doppler shift of the second RS as measured at the UE, Doppler spread of the second RS as measured at the UE, average delay of the second RS as measured at the UE, or delay spread of the second RS as measured at the UE.

13. The BS of claim 11, wherein the feedback report comprises a channel state information (CSI) report.

14. The BS of claim 10, wherein the indication consists of a single bit.

15. The BS of claim 10, wherein the indication comprises an implicit indication based on RS receive power feedback for the first RS and RS receive power feedback for the second RS.

16. The BS of claim 10, wherein one or more processors are further configured to cause the BS to:
receive, via one or more of the first TRP or the second TRP, an uplink RS from the UE; and
calculate, based on the uplink RS, one or more of a Doppler shift or a Doppler spread of one or more of the first RS or the second RS.

17. The BS of claim 10, wherein one or more processors are further configured to cause the BS to receive, via one or more of the first TRP or the second TRP, an uplink RS from the UE, wherein the indication comprises an implicit indication based on resource parameters used for transmission of the uplink RS.

18. The BS of claim 10, wherein the first RS and the second RS are transmitted in a first time period.

19. A method for wireless communication by a user equipment (UE), comprising:
receiving a first reference signal (RS) from a first transmission reception point (TRP);
receiving a second RS from a second TRP, wherein the first TRP and the second TRP are both associated with a base station (BS);
transmitting, to the BS, an indication that one of a first shifted carrier frequency at which the first RS is received or a second shifted carrier frequency at which the second RS is received is preferred for use by the UE as a reference carrier frequency for demodulation, and
receiving, from the BS, a second indication of a frequency for the UE to use as the reference carrier frequency for demodulation, and
wherein the second indication comprises an implicit indication comprising an order in which a transmission configuration indicator state associated with the frequency is listed in an activation message.

20. The method of claim 19, wherein the indication is transmitted in a feedback report comprising Doppler feedback based on the first RS and the second RS.

21. The method of claim 20, wherein the Doppler feedback comprises one or more of Doppler shift of the first RS as measured at the UE, Doppler spread of the first RS as measured at the UE, average delay of the first RS as measured at the UE, or delay spread of the first RS as measured at the UE, and wherein the Doppler feedback comprises one or more of Doppler shift of the second RS as measured at the UE, Doppler spread of the second RS as measured at the UE, average delay of the second RS as measured at the UE, or delay spread of the second RS as measured at the UE.

22. The method of claim 19, wherein the indication consists of a single bit.

23. The method of claim 19, wherein the indication comprises an implicit indication based on RS receive power feedback for the first RS and RS receive power feedback for the second RS.

24. The method of claim 19, further comprising: transmitting an uplink RS to the first TRP and the second TRP, wherein the indication is transmitted separately from the uplink RS.

25. The method of claim 19, further comprising: transmitting an uplink RS to the first TRP and the second TRP, wherein the indication comprises an implicit indication based on resource parameters used for transmitting the uplink RS.

26. A method for wireless communication by a base station (BS), comprising:
transmitting, via a first transmission reception point (TRP), a first reference signal (RS) to a user equipment (UE);
transmitting, via a second TRP, a second RS to the UE, wherein the first TRP and the second TRP are both associated with the BS;
receiving, via one or more of the first TRP or the second TRP, an indication from the UE that one of a first shifted carrier frequency at which the first RS was received by the UE or a second shifted carrier frequency at which the second RS was received by the UE is preferred for use by the UE as a reference carrier frequency for demodulation, and transmitting a second indication to the UE, the second indication configured to provide the UE with a frequency to use as the reference carrier frequency for demodulation, and wherein the second indication comprises an implicit indication comprising an order in which a transmission configuration indicator state associated with the frequency is listed in an activation message.

* * * * *